United States Patent
Lee et al.

(10) Patent No.: US 10,480,922 B2
(45) Date of Patent: Nov. 19, 2019

(54) CENTER ERROR VALUE OF BEARINGS MEASURING METHOD

(71) Applicants: LG ELECTRONICS INC., Seoul (KR); THE INDUSTRY & ACADEMIC COOPERATION IN CHUNGNAM NATIONAL UNIVERSITY, Daejeon (KR)

(72) Inventors: Namsoo Lee, Seoul (KR); Myounggyu Noh, Daejeon (KR); Soyoon Kim, Seoul (KR); Seongmin Jang, Seoul (KR); Jinhee Jeong, Seoul (KR); Seongki Baek, Seoul (KR); Sunggyu Nam, Chilgok-gun (KR)

(73) Assignees: LG Electronics Inc., Seoul (KR); The Industry & Academic Cooperation in Chungnam National University, Daejeon (KR)

( * ) Notice: Subject to any disclaimer, the term of this patent is extended or adjusted under 35 U.S.C. 154(b) by 328 days.

(21) Appl. No.: 15/615,064

(22) Filed: Jun. 6, 2017

(65) Prior Publication Data

US 2018/0023938 A1 Jan. 25, 2018

(30) Foreign Application Priority Data

Jul. 25, 2016 (KR) ........................ 10-2016-0094421

(51) Int. Cl.
*H02K 7/09* (2006.01)
*G01B 5/14* (2006.01)
(Continued)

(52) U.S. Cl.
CPC ............ *G01B 5/14* (2013.01); *F16C 32/0446* (2013.01); *F16C 32/0451* (2013.01);
(Continued)

(58) Field of Classification Search
CPC ....... G01B 5/14; G01B 5/146; F16C 32/0451; F16C 2362/52; G01M 13/04
(Continued)

(56) References Cited

U.S. PATENT DOCUMENTS

| 4,095,377 A | 6/1978 | Sugita |
| 5,345,127 A * | 9/1994 | New ................... F16C 32/0402 310/90.5 |

(Continued)

FOREIGN PATENT DOCUMENTS

| CN | 102287242 A | 12/2011 |
| CN | 102425557 A | 4/2012 |

(Continued)

*Primary Examiner* — Jianchun Qin
(74) *Attorney, Agent, or Firm* — Birch, Stewart, Kolasch & Birch, LLP (57) ABSTRACT

A method of measuring a center error between bearings includes disposing both sides of a rotation shaft on inner circumferential surfaces of a magnetic bearing and a backup bearing, applying current to the magnetic bearing to produce movement of the rotation shaft, determining a contact point between the rotation shaft and the backup bearing according to movement of the rotation shaft, determining a final target value using the contact point and predetermined position information of the magnetic bearing, determining a magnetic center of the magnetic bearing through the final target value, comparing the magnetic center of the magnetic bearing and a mechanical center of the backup bearing to determine a center error, and aligning the magnetic center of the magnetic bearing and the mechanical center of the backup bearing based on the determined center error.

9 Claims, 5 Drawing Sheets

(51) Int. Cl.
*F16C 32/04* (2006.01)
*G01M 13/04* (2019.01)

(52) U.S. Cl.
CPC ............ *G01B 5/146* (2013.01); *G01M 13/04* (2013.01); *F16C 2362/52* (2013.01)

(58) Field of Classification Search
USPC ........................................................ 310/90.5
See application file for complete search history.

(56) References Cited

U.S. PATENT DOCUMENTS

| | | | | |
|---|---|---|---|---|
| 5,714,818 | A | * | 2/1998 | Eakman ................. F16C 17/02 310/90.5 |
| 5,747,907 | A | * | 5/1998 | Miller ................. F16C 32/0442 310/103 |
| 2013/0156544 | A1 | * | 6/2013 | Sishtla ................ F04D 27/0261 415/1 |

FOREIGN PATENT DOCUMENTS

| | | |
|---|---|---|
| CN | 104198118 A | 12/2014 |
| CN | 104457649 A | 3/2015 |
| CN | 105136170 A | 12/2015 |
| CN | 105588507 A | 5/2016 |
| JP | 56-33247 A | 4/1981 |

\* cited by examiner

CENTER ERROR VALUE OF BEARINGS MEASURING METHOD

CROSS-REFERENCE TO RELATED APPLICATIONS

This application claims priority under 35 U.S.C. 119 and 35 U.S.C. 365 to Korean Patent Application No. 10-2016-0094421 filed on Jul. 25, 2016 in Korea, the entire contents of which is hereby incorporated by reference in its entirety.

BACKGROUND

In general, an air conditioner refers to an apparatus for cooling or heating an interior space. The air conditioner includes a compressor for compressing refrigerant, a condenser for condensing refrigerant discharged from the compressor, an expander for expanding refrigerant passing through the condenser and an evaporator for evaporating refrigerant expanded by the expander.

A turbo refrigerator may include a compressor for compressing low-pressure refrigerant into high-pressure refrigerant, a condenser, an expansion valve and an evaporator to perform a refrigeration cycle.

The turbo refrigerator includes a centrifugal type turbo compressor (hereinafter, turbo compressor). The turbo compressor discharges gas in a high-pressure state while converting kinetic energy generated by a driving motor into static energy and may include one or more impellers rotating by driving force of the driving motor to compress refrigerant and a housing in which the impellers are mounted.

In addition, the turbo compressor may include a bearing supporting axial force applied to a rotation shaft in a process of rotating the impeller connected to the rotation shaft at high speed.

In general, representative examples of the bearing used for the turbo compressor include a magnetic bearing. More specifically, when a voltage is applied to the magnetic bearing in order to support axial force applied to the rotation shaft, magnetic force is generated. Using the generated magnetic force, the magnetic bearing supports the rotation shaft in a non-contact manner, thereby reducing loss due to friction generated by contact with the rotation shaft and rotating the rotation shaft at a high speed.

In addition, when the magnetic bearing is used in the turbo compressor, a backup bearing may be formed in order to efficiently support the rotation shaft even when the voltage is not applied to the magnetic bearing or an error occurs in the magnetic bearing.

That is, one side of the rotation shaft may support the magnetic bearing and the other side thereof may support the backup bearing, thereby always stably supporting the rotation shaft.

The center of the magnetic bearing may be defined as a "magnetic center" and the center of the backup bearing may be defined as a "mechanical center". If the magnetic center and the mechanical center are aligned, when the voltage is applied to the magnetic bearing, the rotation shaft is stably supported and rotated.

However, when the magnetic center and the mechanical center are not aligned, the rotation shaft does not appropriately rotate, thereby mechanically damaging the turbo compressor. When the magnetic center and the mechanical center are not aligned, an error between the centers may be defined as a "center error".

From the viewpoint of management of quality of the turbo compressor, it is necessary to measure the "center error" in order to align the magnetic center and the mechanical center.

However, in the related art, a levitation controller was used to measure the center error. The levitation controller uses a method of assembling the magnetic bearing and the backup bearing in the rotation shaft and rotating the rotation shaft in a state of inserting the assembled device into the levitation controller to measure the center error between the magnetic bearing and the backup bearing.

However, the conventional center error measurement method has the following problems.

First, the levitation controller for measuring the center error is required. In particular, the center error cannot be measured without the levitation controller.

Second, in the levitation controller, measurement can be performed in a state in which the magnetic bearing and the backup bearing are both assembled in the rotation shaft. That is, since the center error can be measured in a state of assembling the magnetic bearing, the rotation shaft and the backup bearing, failure of a product can be checked but a product cannot be disassembled and reassembled. That is, the center error can be measured after assembly.

SUMMARY

An object of the present invention is to provide a method of measuring a center error between bearings, which is capable of measuring a center error between a magnetic center of a magnetic bearing and a mechanical center of a backup bearing without using a levitation controller. Another object of the present invention is to provide a method of measuring a center error between bearings, which is capable of measuring a center error before assembling a magnetic bearing, a rotation shaft and a backup bearing, such that the magnetic bearing, the rotation shaft and the backup bearing are assembled in a state in which the magnetic center and the mechanical center match.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
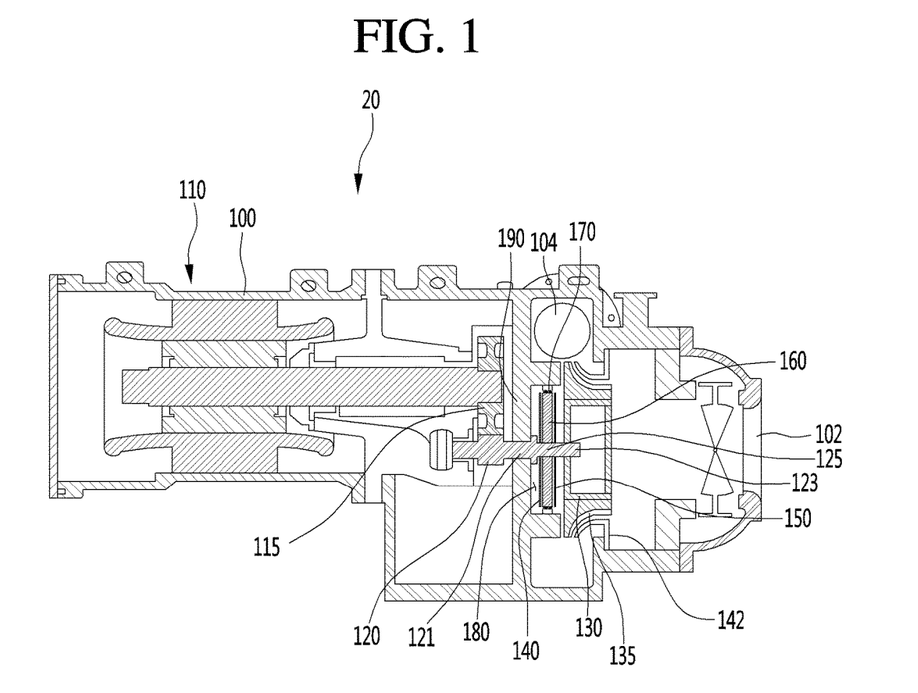
FIG. 1 is a side cross-sectional view of a turbo compressor having a bearing mounted therein according to an embodiment of the present invention.

FIG. 1 is a side cross-sectional view showing the structure of a turbo compressor having a bearing mounted therein, which is used upon measuring a center error between bearings, according to an embodiment of the present invention.

Referring to FIG. 1, the compressor 20 includes a casing 100 having a refrigerant inlet 102 and a refrigerant outlet 104 formed therein, a motor 110 provided in the casing 100, a rotation shaft 120 provided in the casing 100 and rotating by driving force of the motor 110 and a power delivery member 115 connecting the motor 110 and the rotation shaft 120 to deliver the driving force of the motor 110 to the rotation shaft 120.

The compressor 20 further includes a rotation body 130 located in the casing 100 and rotating by the rotation shaft 120 and an impeller 135 coupled to the rotation body 130 to compress refrigerant. The impeller 135 includes a hub coupled to the outside of the rotation body 130 and a plurality of blades coupled to the hub to compress refrigerant. A combination of the rotation body 130 and the impeller 135 is referred to as an "impeller device".

A shroud 142 surrounding the impeller 135 is provided in the casing 100.

Refrigerant introduced through the refrigerant inlet 102 flows into a space (suction space) between the impeller 135 and the second shroud 142.

The impeller 135 rotates along with the rotation shaft 120. In a process of rotating the impeller 135, refrigerant is sucked into the suction space of the impeller 135 and the compressed refrigerant is discharged through the refrigerant outlet.

The rotation shaft 120 may penetrate through the rotation body 130. At least a portion of the outer circumferential surface of the rotation shaft 120 may be supported by a wall 190 provided inside the casing 100.

In summary, the rotation shaft 120 includes a first part 121 supported by the wall 190 and a second part 123 coupled to the rotation body 130. The first part may be referred to as a "wall supporter" and the second part may be referred to as a "body coupler".

The rotation shaft 120 is formed between the first part 121 and the second part 123 and includes a third part 125 which may be supported by bearings 140 and 150. The third part may be referred to as a "bearing supporter".

A predetermined space 180 is defined by the impeller device 130 and 135, the wall 190 and the rotation shaft 120. The space 180 may be referred to as a "mounting space" in which a sealing member 170 may be mounted. The rotation shaft 120 may pass through the mounting space 180.

In the mounting space 180, the third part 125 of the rotation shaft 120, a thrust collar 160 extending in an outer radial direction of the third part 125, the plurality of bearings 140 and 150 provided at both sides of the thrust collar 160 and a sealing member 170 surrounding the outer circumferential surface of the thrust collar 160 are mounted.

The "radial direction" may mean a direction perpendicular to the extension direction of the rotation shaft 120.

The plurality of bearings 140 and 150 may include a magnetic bearing 140 and a backup bearing 150. In this case, one side of the bearing supporter may be supported by the magnetic bearing 140 and the other side thereof may be supported by the backup bearing 150.

The magnetic bearing 140 forms a magnetic field when current is applied and supports a bearing supporter of the rotation shaft 120 using the formed magnetic field in a non-contact manner.

The backup bearing 150 selectively and mechanically contacts and supports the rotation shaft 120 in order to maintain support of the rotation shaft 120, when current is not applied to the magnetic bearing 140 or an error occurs in the magnetic bearing 140.

Figure 2:
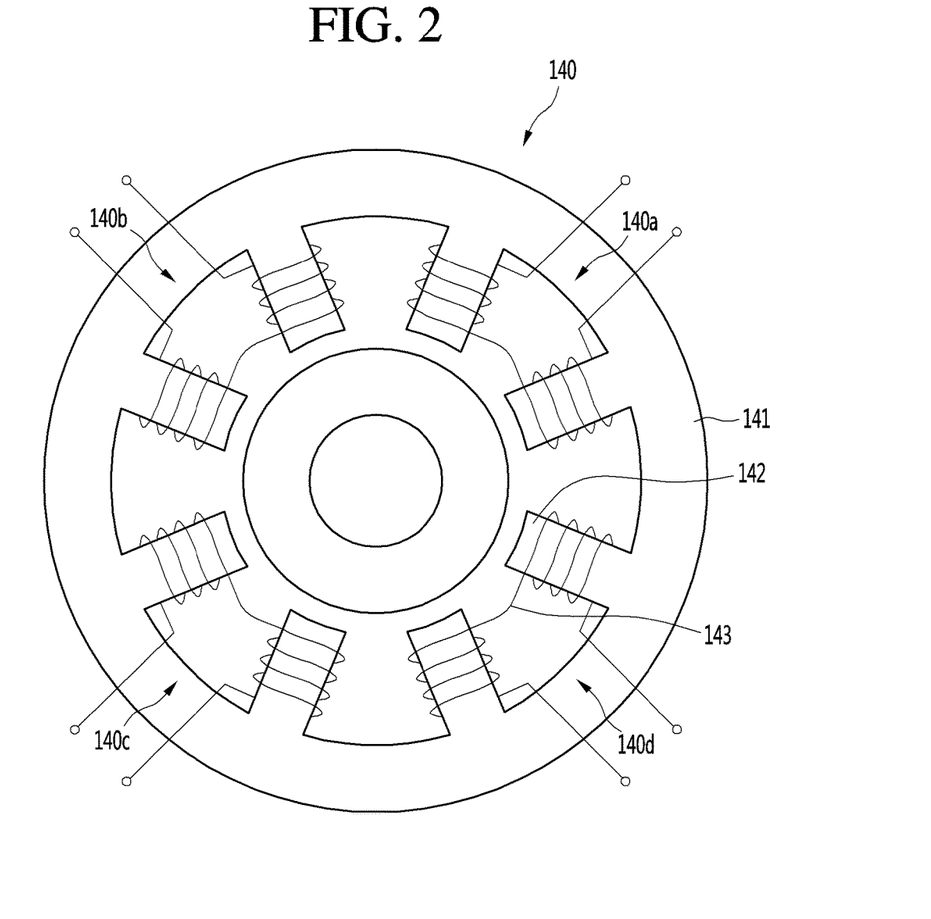
FIG. 2 is a diagram showing the configuration of a magnetic bearing according to an embodiment of the present invention.

FIG. 2 is a diagram showing the configuration of the magnetic bearing.

Referring to FIG. 2, the magnetic bearing 140 may include a magnetic bearing body 141 having a ring shape, one or more stator salient poles 142 protruding from the inside of the magnetic bearing body 141 toward a center thereof and a coil 143 connected to the stator salient poles 142 to form a magnetic field according to flow of current.

Although eight stator salient poles 142 are formed at the inside of the magnetic bearing body 141 in the present embodiment, the number of stator salient poles may be changed according to the size of the magnetic bearing 140 or the size of the rotation shaft 120 used in the turbo compressor 20.

The stator salient poles 142 may include eight stator salient poles 142 provided in the extension direction of the inner circumferential surface of the magnetic bearing body 41 to be spaced apart from each other at a predetermined interval. When a stator salient pole located in a direction corresponding to one o'clock direction of a clock is defined as a first stator salient pole, the stator salient poles sequentially provided in a clockwise direction are defined as second to eighth stator salient poles, respectively.

The coil 143 forms a magnetic field upon applying current. The coil 143 may include a first coil connected to the first stator salient pole and the second stator salient pole, a second coil connected to the third stator salient pole and the fourth stator salient pole, a third coil connected to the fifth stator salient pole and the sixth stator salient pole and a fourth coil connected to the seventh stator salient pole and the eighth stator salient pole.

That is, when current is applied to the first coil, the magnetic field may be formed in a direction between the first stator salient pole and the second stator salient pole. In contrast, when current is applied to the third coil, the magnetic field may be formed in a direction between the fifth stator salient pole and the sixth stator salient pole.

Hereinafter, for convenience of description, the first stator salient pole, the second stator salient pole and the first coil are defined as a first magnetic force forming part 140a, the third stator salient pole, the fourth stator salient pole and the second coil are defined as a second magnetic force forming part 140d, the fifth stator salient pole, the sixth stator salient pole and the third coil are defined as a third magnetic force forming part 140c, and the seventh stator salient pole, the eighth stator salient pole and the fourth coil are defined as a fourth magnetic force forming part 140b.

That is, in the magnetic bearing 140, the first magnetic force forming part 140a, the second magnetic force forming part 140d, the third magnetic force forming part 140c and the fourth magnetic force forming part 140b are provided on the inner circumferential surface of the magnetic bearing body 141 having the ring shape to be spaced apart from each other at a predetermined interval. More specifically, the first magnetic force forming part 140a may be provided on the inner circumferential surface located at 45 degrees from the center of the magnetic bearing body 141 in a right upper direction and the second magnetic force forming part 140d may be provided on the inner circumferential surface located at 45 degrees from the center of the magnetic bearing body 141 in a right lower direction. The third magnetic force forming part 140c may be provided on the inner circumferential surface located at 45 degrees from the center of the magnetic bearing body 141 in a left lower direction and the fourth magnetic force forming part 140b may be provided on the inner circumferential surface located at 45 degrees from the center of the magnetic bearing body 141 in a left upper direction.

In the magnetic bearing 140, the rotation shaft may be provided and supported in an opening formed by the plurality of magnetic force forming parts formed on the inner circumferential surface of the magnetic bearing body 141.

In addition, the backup bearing 150 has a ring shape and the inner circumferential surface of the backup bearing 150 is smaller than the inner circumferential surface of the magnetic bearing body.

In a state in which current is applied to the magnetic bearing 140, the rotation shaft 120 is provided at the center of the magnetic bearing 140 and is supported in a non-contact manner. That is, when the same current is applied to the first to fourth magnetic force forming units of the magnetic bearing 140, the rotation shaft 120 may be supported such that the central axis thereof is located at the center of the magnetic bearing 140.

For convenience, directions are defined. The center of the magnetic bearing is defined as a point 0, a vertical direction is defined as a y-axis direction and a horizontal direction is defined as an x-axis direction.

That is, a right direction of the magnetic bearing is defined as a +x direction, a left direction thereof is defined as a −x direction, an upper direction thereof is defined as a +y direction, and a lower direction thereof is defined as a −y direction.

Hereinafter, a method of measuring a center error between bearings according to an embodiment of the present invention will be described.

Figure 3:
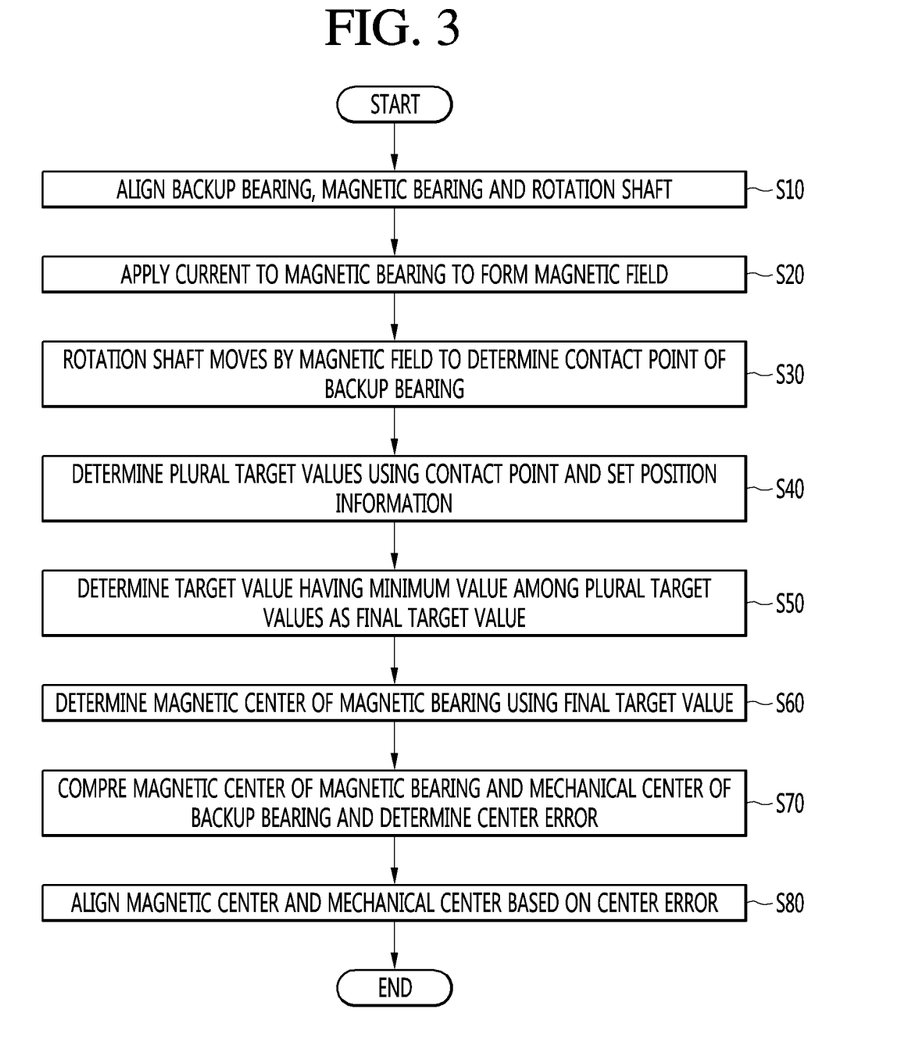
FIG. 3 is a flowchart illustrating a method of measuring a center error between bearings according to an embodiment of the present invention.

FIG. 3 is a flowchart illustrating a method of measuring a center error between bearings according to an embodiment of the present invention.

Referring to FIG. 3, the magnetic bearing 140, the backup bearing 150 and the rotation shaft 120 are aligned (S10). More specifically, the magnetic bearing 140 and the backup bearing 150 may be located at both sides of the rotation shaft 120. In this case, the rotation shaft 120 may be in the gap of the magnetic bearing and the gap of the backup bearing. That is, both sides of the rotation shaft 120 may be provided on the inner circumferential surfaces of the magnetic bearing 140 and the backup bearing 150.

In this state, when current is applied to the magnetic bearing 140 (S20), a step of producing movement of the rotation shaft 120 may be performed. The step of producing movement includes applying current to a portion of the magnetic bearing 140 such that the rotation shaft 120 contacts the inner circumferential surface of the magnetic bearing 140.

The step of producing movement will now be described. If current is applied to the portion of the magnetic bearing 140, the rotation shaft 120 may move to contact the inside of the backup bearing 150 by magnetic force generated by the magnetic bearing 140.

In this embodiment, as the first to fourth magnetic force forming parts are formed, currents applied to the first to fourth magnetic force forming part are combined to form eight magnetic forces in the inner circumferential surface of the magnetic bearing 140. In addition, the rotation shaft 120 may contact eight contact points located inside the backup bearing 150.

For example, the case where eight magnetic forces are formed in the inner circumferential surface of the magnetic bearing 140 will be described.

When current is applied to the first magnetic force forming part 140a and the second magnetic force forming part 140d of the magnetic bearing 140, magnetic force may be formed at the right side of the center of the magnetic bearing 140, that is, in the +x direction. Magnetic force formed at this time is defined as first magnetic force.

When current is applied to only the first magnetic force forming part 140a of the magnetic bearing 140, magnetic force may be formed at 45 degrees from the center of the magnetic bearing 140 in the right upper direction, that is, in the +x and +y directions. Magnetic force formed at this time is defined as second magnetic force.

When current is applied to the first magnetic force forming part 140a and the fourth magnetic force forming part 140b of the magnetic bearing 140, magnetic force may be formed at the upper side of the center of the magnetic bearing 140, that is, in the +y direction. Magnetic force formed at this time is defined as third magnetic force.

When current is applied to only the fourth magnetic force forming part 140b of the magnetic bearing 140, magnetic force may be formed at 45 degrees from the center of the magnetic bearing 140 in the left upper direction, that is, in the −x and +y directions. Magnetic force formed at this time is defined as fourth magnetic force.

When current is applied to the fourth magnetic force forming part 140b and the third magnetic force forming part 140c of the magnetic bearing 140, magnetic force may be formed at the left side of the center of the magnetic bearing 140, that is, in the −x direction. Magnetic force formed at this time is defined as fifth magnetic force.

When current is applied to the third magnetic force forming part 140c of the magnetic bearing 140, magnetic force may be formed at 45 degrees from the center of the magnetic bearing 140 in the left lower direction, that is, in the −x and −y directions. Magnetic force formed at this time is defined as sixth magnetic force.

When current is applied to the third magnetic force forming part 140c and the second magnetic force forming part 140d of the magnetic bearing 140, magnetic force may be formed at the lower side of the center of the magnetic bearing 140, that is, in the −y direction. Magnetic force formed at this time is defined as seventh magnetic force.

When current is applied to only the second magnetic force forming part 140d of the magnetic bearing 140, magnetic force may be formed at 45 degrees from the center of the magnetic bearing 140 in the right lower direction, that is, in the +x and −y direction. Magnetic force formed at this time is defined as eighth magnetic force.

That is, magnetic forces may be formed in eight directions of the magnetic bearing 140. The following table shows current applied to the magnetic force forming parts in order to form magnetic forces in eight directions, in a state of setting the +x direction to 0 degrees.

In a state in which the magnetic bearing 140, the backup bearing 150 and the rotation shaft 120 are aligned, current is applied to the magnetic force forming parts (S20) to form eight magnetic forces from the center of the magnetic bearing 140. In this case, the rotation shaft may contact eight contact points of the inner circumferential surface of the backup bearing (S30).

More specifically, a contact point when first magnetic force is formed is defined as a first contact point and contact points when second to eighth magnetic forces are formed are respectively defined as second to eighth contact points. The first to eighth contact points may be arbitrary portions of the inner circumferential surface of the backup bearing which the rotation shaft contacts.

Table 1 below shows the magnetic forming parts, to which current is applied, the directions of the magnetic forces formed thereby, and the contact points.

TABLE 1

| Contact point | Pull Direction | Ia | Ib | Ic | Id |
|---|---|---|---|---|---|
| 1 | 0° | $I_{max}$ | 0 | 0 | $I_{max}$ |
| 2 | 45° | $I_{max}$ | 0 | 0 | 0 |
| 3 | 90° | $I_{max}$ | $I_{max}$ | 0 | 0 |
| 4 | 135° | 0 | $I_{max}$ | 0 | 0 |
| 5 | 180° | 0 | $I_{max}$ | $I_{max}$ | 0 |
| 6 | 225° | 0 | 0 | $I_{max}$ | 0 |
| 7 | 270° | 0 | 0 | $I_{max}$ | $I_{max}$ |
| 8 | 315° | 0 | 0 | 0 | $I_{max}$ |

In Table 1, Ia denotes current applied to the first magnetic force forming part, Ib is current applied to the fourth magnetic force forming part, Ic denotes current applied to the third magnetic force forming part, and Id denotes current applied to the second magnetic force forming part. In addition, in the direction of magnetic force, 0 degrees denotes a +x-axis direction and an angle increasing from 0 degrees means an angle in a counterclockwise direction.

Figure 4:
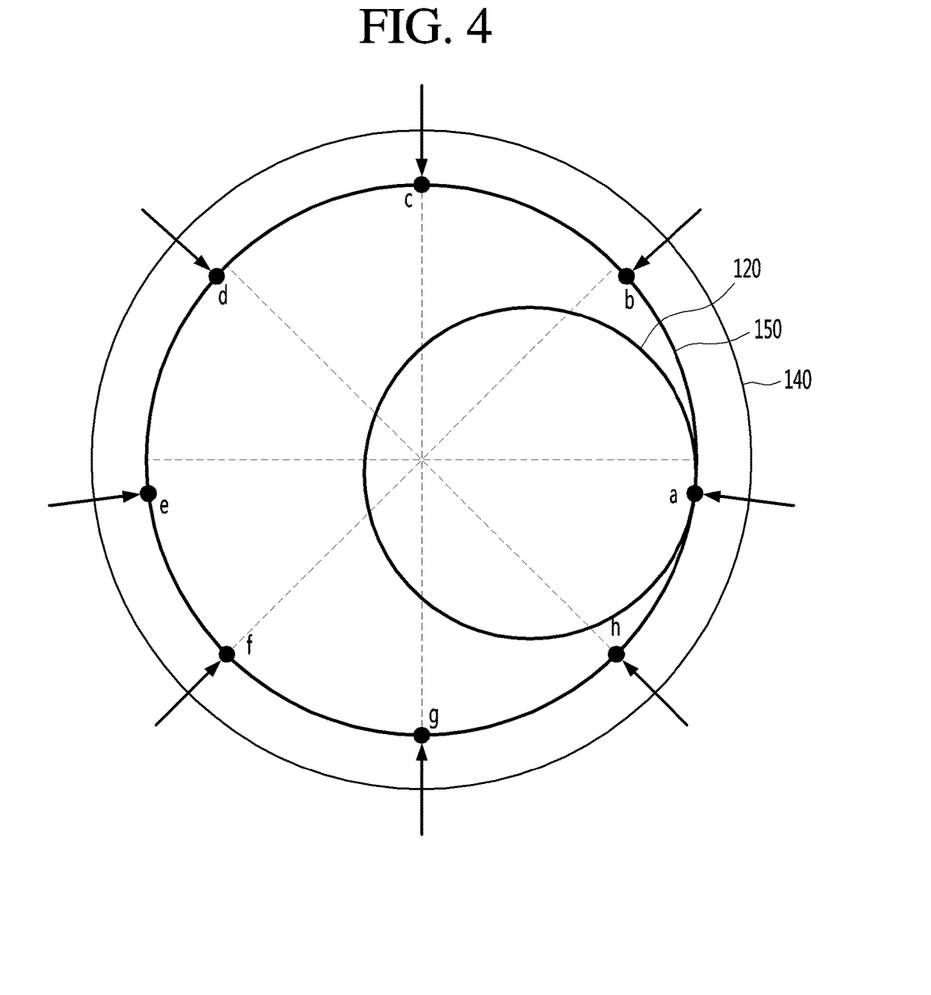
FIG. 4 is a diagram showing a configuration in which a rotation shaft contacts a first contact point of a backup bearing when the centers of a magnetic bearing and the backup bearing match, according to an embodiment of the present invention.
Figure 5:
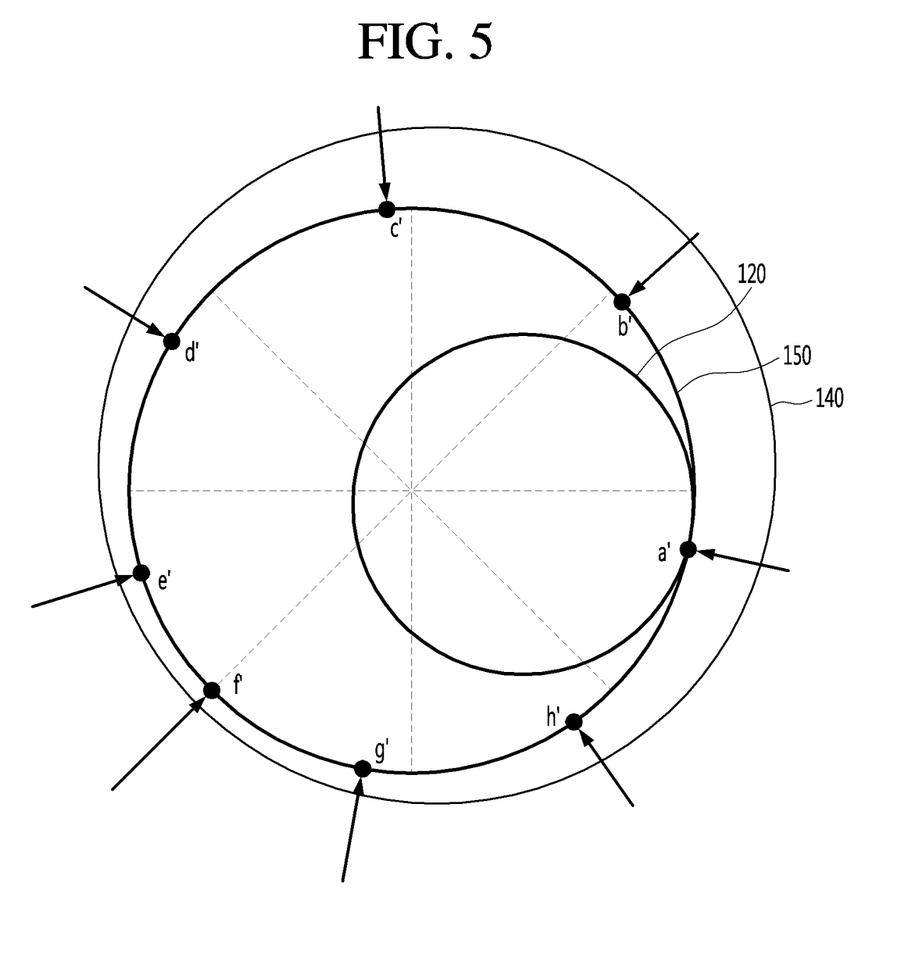
FIG. 5 is a diagram showing a configuration in which a rotation shaft contacts a first contact point of a backup bearing when the centers of a magnetic bearing and the backup bearing do not match, according to an embodiment of the present invention.

FIG. 4 is a diagram showing a configuration in which a rotation shaft contacts a first contact point of a backup bearing when the centers of a magnetic bearing and the backup bearing match, according to an embodiment of the present invention, and FIG. 5 is a diagram showing a configuration in which a rotation shaft contacts a first contact point of a backup bearing when the centers of a magnetic bearing and the backup bearing do not match, according to an embodiment of the present invention.

Referring to FIG. 4, it is possible to check the position of the contact point of the backup bearing 150 when the magnetic center of the magnetic bearing 140 matches the mechanical center of the backup bearing 150.

More specifically, when the magnetic center of the magnetic bearing 140 matches the mechanical center of the backup bearing 150, the first contact point a may be formed on the inner circumferential surface of the backup bearing in the +x-axis direction and the second to eighth contact points b to h may be formed to be spaced apart from each other at a predetermined interval in the counterclockwise direction.

The first contact point a and the fifth contact point e may be formed on the inner circumferential surface of the backup bearing at positions shifted from the +x-axis direction or the −x-axis direction downward by a predetermined distance due to gravity.

For example, when current is applied to the first magnetic force forming part 140a and the second magnetic force forming part 140d, the rotation shaft may be moved to contact the first contact point a of the backup bearing. Similarly, when current is applied to the first magnetic force forming part 140a, the rotation shaft may be moved to contact the second contact point b of the backup bearing.

Referring to FIG. 5, it is possible to check the position of the contact point of the backup bearing 150 when the magnetic center of the magnetic bearing 140 does not match the mechanical center of the backup bearing 150. FIGS. 4 and 5 show the case where the mechanical center of the backup bearing is shifted from the magnetic center of the magnetic bearing to the left lower side.

In this case, it can be seen that, as compared to the case where the mechanical center and the magnetic center match, a distance between the contact points gradually decreases toward the left lower side, to which the mechanical center of the backup bearing 150 is shifted, and gradually increases toward the right upper side.

That is, the first to eighth contact points may be changed according to error between the magnetic center and the mechanical center.

Through the step of producing movement, the rotation shaft may contact the first to eighth contact points (S30). That is, current applied to the first to fourth magnetic force forming parts of the magnetic bearing may be adjusted to move the rotation shaft to contact the inner circumferential surface of the backup bearing eight times, and the coordinates of the contact points of the inner circumferential surface of the backup bearing which the rotation shaft contacts may be measured. In this case, the measured contact points may be defined as the first to eighth contact points as described above.

The first to eighth contact points may be changed according to center error between the magnetic center of the magnetic bearing and the mechanical center of the backup bearing, as shown in FIGS. 4 and 5.

A final target value may be determined using the coordinates of the first to eighth contact points measured in the movement step and the magnetic force formed in the magnetic bearing when the rotation shaft contacts each contact point. In a process of obtaining the final target value, a plurality of target values may be determined (S40).

An equation for obtaining the target value is as follows.

$$J = \sum_{i=1}^{8} \left[ \tan^{-1}\left(\frac{y_{c,i}}{x_{c,i}}\right) - \tan^{-1}\left(\frac{F_{y,i}}{F_{x,i}}\right) \right]^2 \quad \text{[Equation 1]}$$

In the above Equation, J denotes a target value, xc,i and yc,i are respectively an x coordinate and a y coordinate of a contact point when the rotation shaft contacts the inner circumferential surface of the backup bearing. For example, xc.1 and yc.1 may denote the coordinates of the first contact point, and xc.4 and yc.4 may be the coordinates of the fourth contact point.

In addition, Fx,i and Fy,i mean magnetic force values of the x direction and the y direction when a user determines a predicted value of the magnetic center of the magnetic bearing. Through the magnetic force value, it is possible to check the set position of the magnetic center. That is, the predicted value of the magnetic center may be predetermined position information. In this case, the predetermined position information may be a predicted coordinate value of the magnetic center.

The magnetic force value may be determined by the length, the cross sectional area and reluctance of the magnetic path at the magnetic center when the user sets the predicted value of the magnetic center of the magnetic bearing, and a criterion for determining the magnetic force is well-known and a detailed description thereof will be omitted.

That is, when the user determines the predicted value of the magnetic center, that is, predetermined position information, the magnetic force may be used as a criterion therefor. For example, the magnetic force value when the user sets the set position coordinates of the magnetic center to x1 and y1 may be different from the magnetic force value when the user sets the set position coordinates of the magnetic center to x2 and y2. That is, the magnetic force value may be changed according to the set position of the magnetic center when the user predicts the magnetic center and determines the set position of the magnetic center.

Accordingly, the x and y coordinates of the contact point are measured and the magnetic force value for obtaining the set position is determined, thereby determining first to eighth target values J1 to J8 of the contact points (first to eighth contact points). A sum of the first to the eighth target values may be determined as a target value.

In addition, as described above, when the user sets a plurality of pieces of predetermined position information which is the predicted value of the magnetic center, a plurality of target values may be determined. Through the plurality of determined target values, the coordinates of the magnetic center of the magnetic bearing may be determined. For example, when the user predicts the magnetic center of the magnetic bearing through four set positions, the number of target values may be 4.

Next, the plurality of target values is compared and a target value having a minimum value among the plurality of target values may be determined as a final target value (S50). For example, if the number of target values is 4 and the target values are respectively 1, 1.5, 2 and 2.5, the final target value may be 1.

In addition, the predicted value of the magnetic center of the magnetic bearing for determining the magnetic force value at the final target value having the minimum value may be set as a final magnetic center (S60). For example, if a target value has a minimum value when the predicted value of the magnetic center is set to x1 and y1 coordinates and thus is determined as the final target value, the magnetic center may have coordinates of x1 and y1.

When the position of the magnetic center is determined, the determined magnetic center and the mechanical center of the backup bearing are compared to determine a center error (S70). More specifically, since the mechanical center of the backup bearing can be measured, the coordinates of the mechanical center of the backup bearing and the coordinates of the determined magnetic center of the magnetic bearing may be compared, thereby measuring the center error.

In addition, the mechanical center of the backup bearing and the magnetic center of the magnetic bearing are aligned based on the measured center error (S80), such that the backup bearing and the magnetic bearing smoothly support the rotation shaft.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of measuring a center error between bearings, the method comprising:
    disposing both sides of a rotation shaft on inner circumferential surfaces of a magnetic bearing and a backup bearing;
    applying current to the magnetic bearing to produce movement of the rotation shaft;
    determining a contact point between the rotation shaft and the backup bearing according to movement of the rotation shaft;
    determining a final target value using the contact point and predetermined position information of the magnetic bearing;
    determining a magnetic center of the magnetic bearing through the final target value;
    comparing the magnetic center of the magnetic bearing and a mechanical center of the backup bearing to determine a center error; and
    aligning the magnetic center of the magnetic bearing and the mechanical center of the backup bearing based on the determined center error.

2. The method according to claim 1, wherein the predetermined position is a predicted value of the magnetic center.

3. The method according to claim 2, wherein the applying of current includes applying current to a plurality of positions of the magnetic bearing to produce movement of the rotation shaft plural times.

4. The method according to claim 3, wherein the determining the contact point includes forming a plurality of contact points as the rotation shaft moves plural times.

5. The method according to claim 4, wherein the determining of the final target value includes:
    determining a plurality of target values according to the plurality of contact points, and
    determining a sum of the plurality of determined target values as a final target value.

6. The method according to claim 2, wherein, in the determining of the final target value, the predetermined position information includes a plurality of pieces of position information.

7. The method according to claim 6, wherein the determining of the final target value includes determining a plurality of target values with respect to the plurality of pieces of position information.

8. The method according to claim 7, wherein the determining of the final target value further includes determining a target value having a minimum value among the plurality of target values as the final target value.

9. The method according to claim 1, wherein the determining of the center error includes comparing measured coordinate values of the magnetic center of the magnetic bearing and measured coordinate values of the mechanical center.

* * * * *